United States Patent [19]
Freudenthaller

[11] Patent Number: 6,071,405
[45] Date of Patent: Jun. 6, 2000

[54] APPARATUS FOR DESALTING AND CONDITIONING WATER

[75] Inventor: Stefan Freudenthaller, Wolkersdorf, Austria

[73] Assignee: Charmilles, Zubehoer, Ersatzteile, Vertriebsgesellschaft mbH, Stockerau, Austria

[21] Appl. No.: 08/856,079

[22] Filed: May 14, 1997

[30] Foreign Application Priority Data

May 14, 1996 [AT] Austria .................................. 280/96 U

[51] Int. Cl.⁷ ...................................................... B01J 47/02
[52] U.S. Cl. ............................................ 210/284; 210/288
[58] Field of Search .................................. 210/284, 288, 210/289, 291, 444, 232

[56] References Cited

U.S. PATENT DOCUMENTS

| | | | |
|---|---|---|---|
| 3,152,077 | 10/1964 | Kryzer | 210/288 |
| 3,174,623 | 3/1965 | Sloan | 210/285 |
| 4,474,620 | 10/1984 | Hall | 210/284 |
| 4,804,465 | 2/1989 | Brown | 210/136 |
| 4,855,046 | 8/1989 | Meehan | 210/232 |
| 5,188,727 | 2/1993 | Kurth et al. | 210/284 |
| 5,269,919 | 12/1993 | von Medlin | 210/288 |

FOREIGN PATENT DOCUMENTS

| | | |
|---|---|---|
| 2200202 | 4/1974 | France . |
| 1 932 205 | 1/1971 | Germany . |
| 2 207 829 | 8/1973 | Germany . |
| 39 11 675 | 11/1989 | Germany . |
| 40 34 269 A1 | 6/1991 | Germany . |

*Primary Examiner*—Ivars Cintins
*Attorney, Agent, or Firm*—Foley & Lardner

[57] ABSTRACT

A device for the desalination and conditioning of water, in particular used water from electrical erosion machines, in which two ion exchange columns (2, 3) are connected one behind the other, one of which (2) is filled with cationic exchange resin and the other (3) is filled with anionic exchange resin, the two ion exchange columns (2, 3) being arranged in a common, tightly sealed casing (1), and the connections for the feed line (5) and the discharge line (6) of each column (2, 3) being led out of the casing (1) in a leakproof manner.

8 Claims, 4 Drawing Sheets

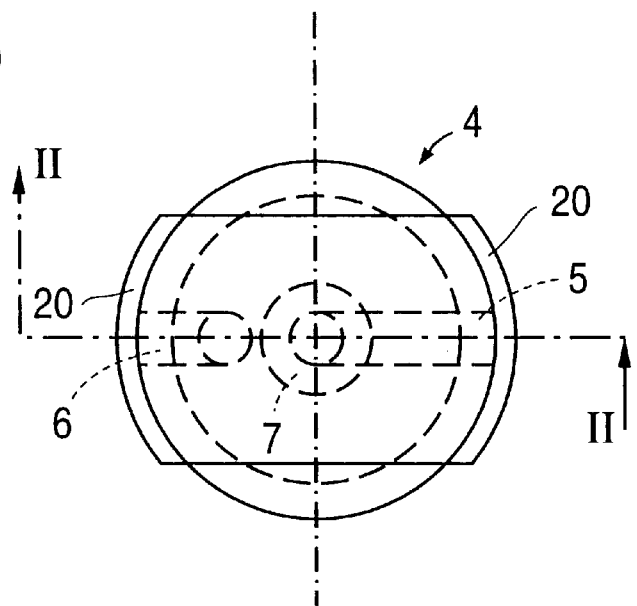
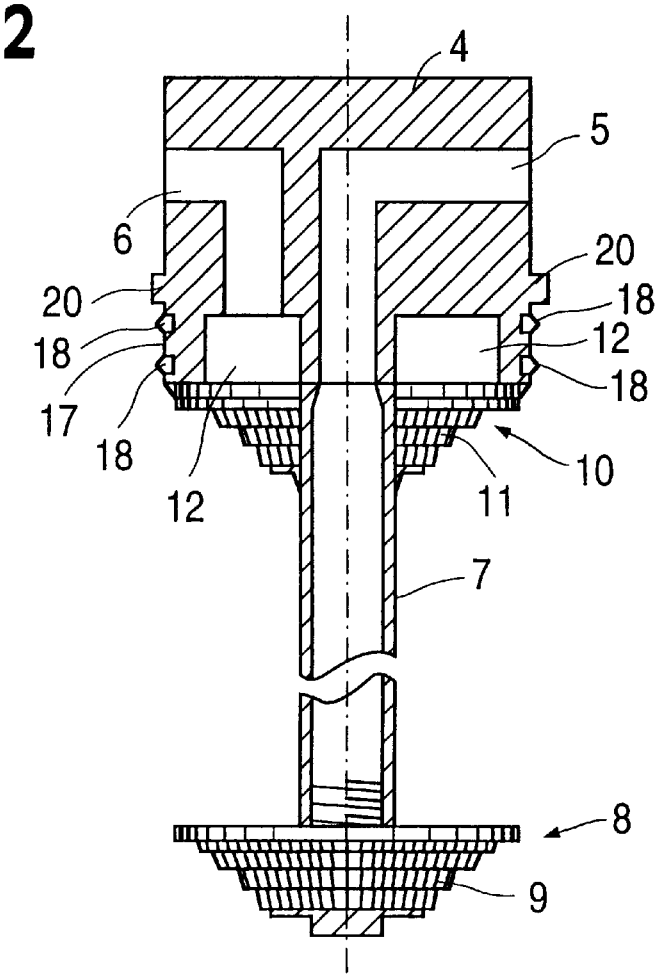

APPARATUS FOR DESALTING AND CONDITIONING WATER

BACKGROUND OF THE INVENTION

The innovation relates to a device for the desalination and conditioning of water, in particular used water from electrical erosion machines, in which device two ion exchange columns are connected one behind the other, one of which is filled with cationic exchange resin and the other is filled with anionic exchange resin.

During the operation of electrical erosion machines it is necessary that the water which is employed in the process has as low a conductivity as possible. To date, in order to reduce the conductivity, only mixed-bed resin systems are in use as transportable units, in which in one column a mixed resin removing both cations and also anions is filled, said mixed resin being only very difficult to regenerate, if this is economically justifiable at all, since before the regeneration the mixed resin has to be separated into its two components. Systems having two separate columns have to date only been used as stationary systems, which means that the machine which has to be supplied with desalinated water cannot be operated during the regeneration of the desalination resins.

SUMMARY OF THE INVENTION

The innovation is based on the object of providing a device of the type mentioned at the beginning which is transportable and whose resins are easy to regenerate.

According to the innovation, this object is achieved in that the two ion exchange columns are arranged in a common, tightly sealed casing, the connections for the feed line and the discharge line of each column being led out of the casing in a leakproof manner. This makes it possible to exchange used devices simply and to transport them to a regeneration installation, the connecting line between the two columns then being removed and the columns being connected separately to the regeneration installation. After the regeneration of the two columns has been completed, they are once more connected in series with each other, so that the device is then ready for use again.

Advantageously, for each column the feed line and the discharge line can be arranged on a common head, which seals off the column at the upper end, a fall pipe reaching to the bottom of the column being connected to the feed line on the side of the head facing the column interior. The interior of the column is thus easily accessible without having to disassemble the column from the device, which is above all beneficial when the resin filling has to be exchanged. In order to achieve uniform flow through the resin whilst avoiding dead spaces, provision can be made at the lower end of the fall pipe of a distributor head which is provided with radially outwardly opening outlet channels or slots. In this arrangement, the channels or slots can be arranged offset in height on several levels, the diameter of the distributor head decreasing downward in stages from level to level. This has the effect that the entering fluid is outwardly guided reliably even in the region of the bottom, which prevents the formation of dead spaces, in particular also in the region of the transition between the bottom and the cylindrical wall of the column.

For uniform withdrawal of the liquid, it is possible to provide, in the head sealing off the column, an annular channel which surrounds the feed line concentrically and from which the discharge line originates and which is open toward the interior of the column. This offers the liquid the possibility of emerging from the column over a large area, which ensures uniform throughput of the liquid through the column, even in the upper region of the latter. In order to avoid dead spaces, even in the region of the head of the column, it is possible to connect upstream of the annular channel a collecting head which surrounds the fall pipe concentrically and is provided with radially directed inlet channels or slots. In the case of the collecting head, too, in order to improve the flow conditions the inlet channels or slots can be arranged offset in height on several levels, the diameter of the collecting head decreasing downward in stages from level to level.

For simple opening of the column and for high tightness, even under relatively high working pressures, the head can be sealed off with respect to a cylindrical inner surface of the column via sealing rings arranged on a cylindrical outer surface, and can have local, radially protruding attachments which, by rotating the head about its central axis, can be moved under corresponding retaining protrusions arranged at the upper end of the column.

BRIEF DESCRIPTION OF THE DRAWINGS

An exemplary embodiment of the innovative device is reproduced in the drawing.

FIG. 2 reproduces the head to be inserted into the column on an enlarged scale, the central part of the fall pipe being cut out.

FIG. 3 illustrates a plan view of the head according to FIG. 2.

DETAILED DESCRIPTION OF THE PREFERRED EMBODIMENT

Figure 1:
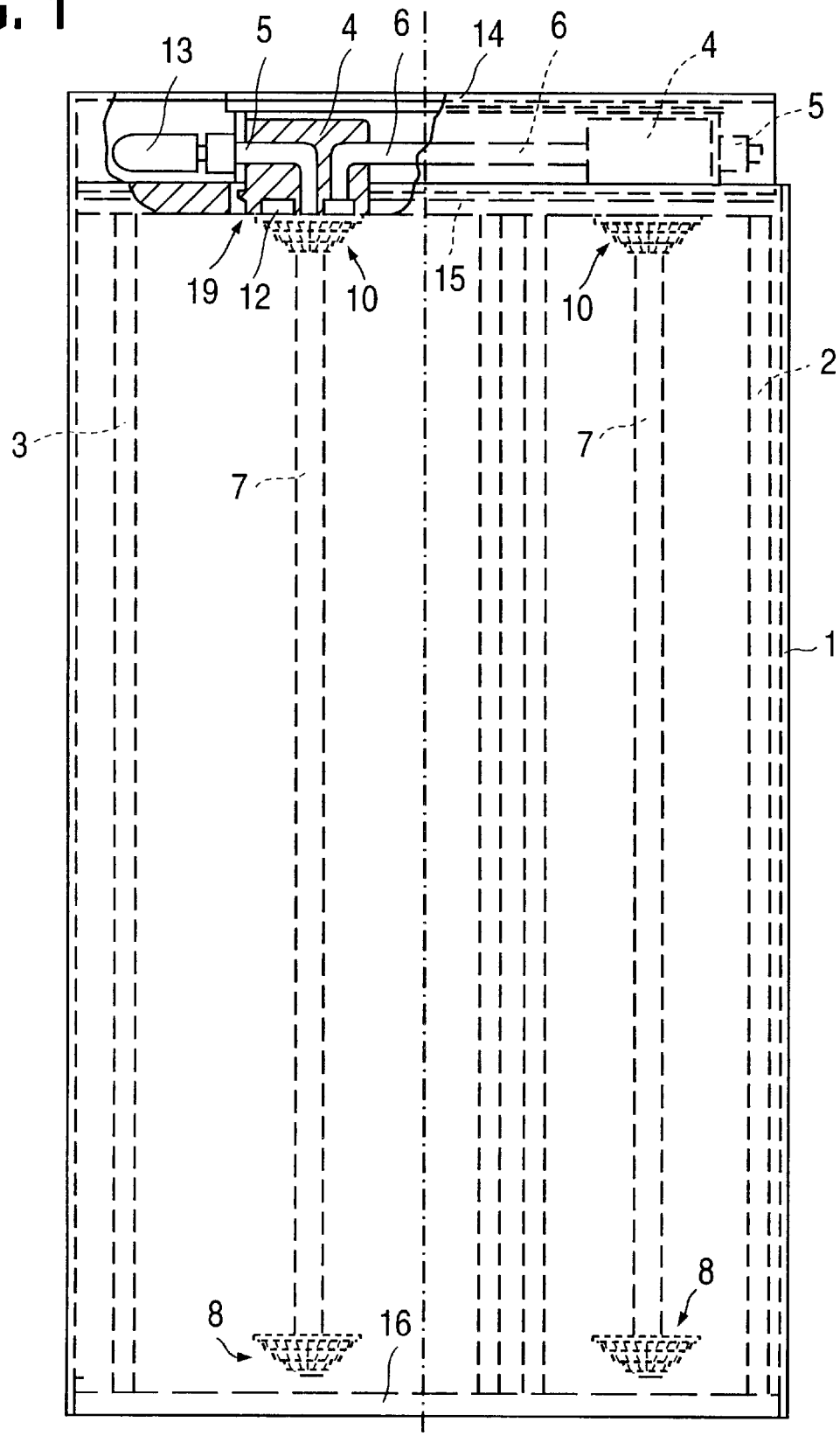
FIG. 1 shows a partially sectioned side view of the device.

Arranged in a casing 1, which has a predominantly rectangular outline, are two columns 2 and 3, of which the column 2 located upstream in the flow direction during the operating cycle is filled with cationic exchange resin and the column 3 located downstream in the flow direction is filled with anionic exchange resin. The columns 2 and 3 comprise a cylindrical wall, which is terminated at the lower end by the bottom 16 of the casing 1 and at the upper end by the upper terminating wall 15 of the casing 1. The upper terminating wall 15 has, in the region of the columns and concentric with the latter, a recess 19 each, into which a head 4, closing the column, is inserted. Each head 4 is provided with a feed line 5 for the water to be treated and with a discharge line 6 for the treated water. The feed line 5 is adjoined, concentrically to the head, by a fall pipe 7 which reaches to the bottom 16 of the columns 2 and 3, respectively. Fitted at the lower end of the fall pipe 7 is a distributor head 8, into which the fall pipe 7 opens and which has outlet channels or slots 9 for the liquid to be treated to flow out into the column.

The head 4 is furthermore fitted with an annular channel 12 which surrounds the fall pipe concentrically and from which the discharge line 6 originates. Connected upstream of this annular channel 12 is a collecting head 10, which is provided with radially directed inlet channels or slots 11. The fall pipe 7 is led through this collecting head 10 in a leakproof manner.

Both in the distributor head 8 and in the collecting head 9, the channels or slots 9 and 11 are arranged on several levels one above the other, that is to say offset in height, the diameter of the distributor head 8 and of the collecting head 10, respectively, decreasing downward in stages from level to level.

In the region which is inserted in the recess 19 of the upper terminating wall 15, the head 4 has an external cylindrical wall 17 which is provided with sealing rings 18 which rest in a leakproof manner on the cylindrical inner wall of the recess 19. On the outer cylinder wall 17, in addition, there are locally provided further radially projecting attachments 20, which cooperate with retaining protrusions 21 which protrude inwardly from a cylindrical concentrically arranged retaining ring 22. Provided between the retaining protrusions 21 are recesses 23, the circumferential extent of which is greater than that of the attachments 20, with the result that the head 4 can be inserted with the attachments 20 between the retaining protrusions 21, through the recesses 23, into the recess 19 in the upper terminating wall 15, and can be fixed in the recess 19 by rotating and hence moving the attachments 20 under the retaining protrusions 21.

The discharge line 6 of the cationic column 2 is connected to the feed line 5 of the anionic column 3 via a bend 13 which is easily removed, for example via plug-in couplings.

The heads 4 and the feed and discharge lines themselves and the connecting bend are covered by means of a cover 14 in the operating condition of the device, only the inlet 24 and the outlet 25 of the device then being visible and accessible from the outside.

Figure 4:
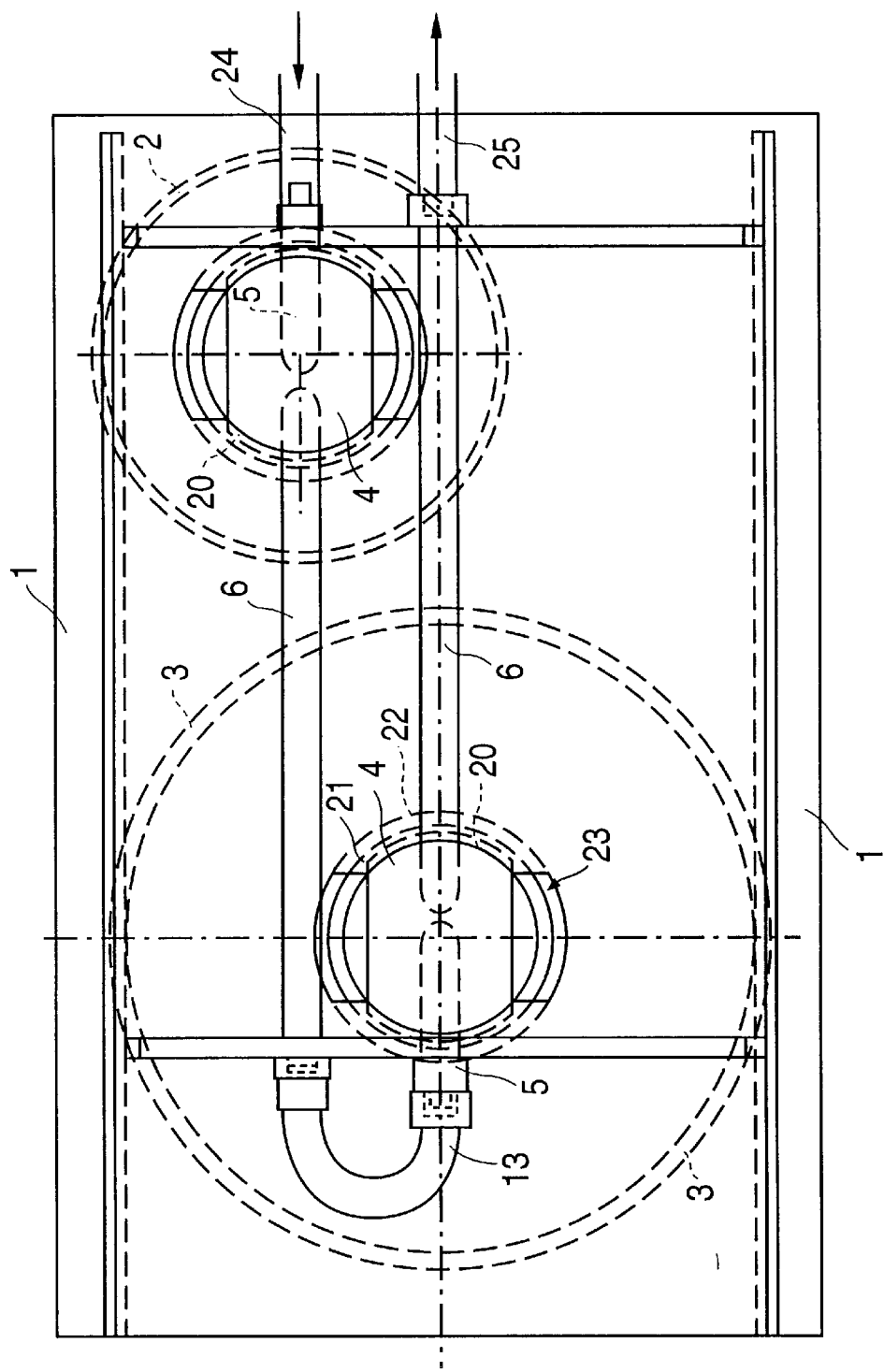
FIG. 4 represents a plan view of the device with the cover removed in the operating condition, FIG. 5 in the regeneration condition.

During the operation of the device (see FIG. 4) the liquid to be treated is supplied via the inlet 24 to the feed line 5 of the head 4 of the cationic column 2, from where it flows downward through the fall pipe 7 to the distributor head 8. The latter distributes the liquid uniformly via the outlet slots 9 over the entire cross section of the column 2. The liquid now rises slowly upward in the column and gives up the cations to the resin in the column 2. At the upper end of the column, the liquid freed of cations then flows via the inlet slots 11 of the collecting head 10 into the latter and passes into the annular channel 12, from which it is discharged by the discharge line 6.

The liquid freed of cations passes via the connecting bend 13 into the feed line 5 of the head 4 of the anionic column 3 and flows through the latter in the same way as the cationic column. The water treated in this way can now be introduced once more into the production process, for example the electric erosion.

Figure 5:
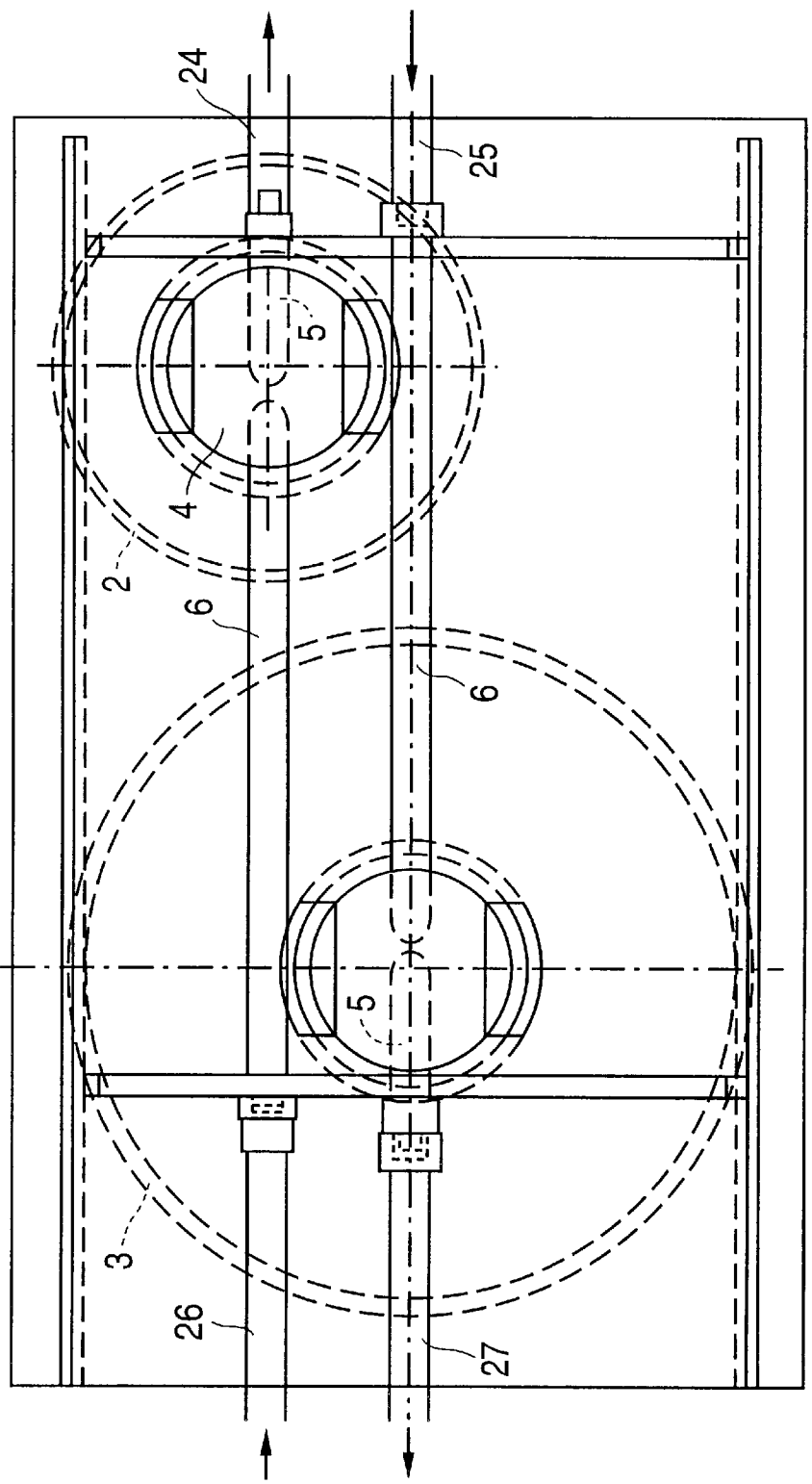

When the resins have to be regenerated because of their loading with cations and anions, the device is disconnected from the machine tool and an exchange device, filled with regenerated resin, is connected. The device filled with used resin is transported to the regeneration point, which can be remote from the production site. The device which is filled with resin to be regenerated is opened by removing the cover 14. The connecting bend 13 is then removed and the device is connected to the regeneration station, as reproduced in FIG. 5. Regeneration liquid is then applied via the regeneration line 26 from above, via the collecting head 10, to the resin of the cationic column 2 and is led downward in the column to the distributor head 8, after which the regeneration liquid leaves the column via the fall pipe 7, the feed line 5 of the head 4 and the inlet 24 of the device. The anionic column 3 is charged with regeneration liquid via the outlet 25 of the device, which flows through the column 3 in the same way as described with reference to the cationic column 2. The used regeneration liquid from the anionic column 3 is discharged via the discharge line 27.

In both columns, the residual regeneration liquid is removed in that, instead of the regeneration liquid, after the regeneration has been completed a compressed gas is led through the columns in the same way as the regeneration liquid, as a result of which the liquid is pressed out by the compressed gas via the fall pipe. On account of the construction of the distributor head, which acts as a collecting head in the regeneration phase, it is ensured that all of the liquid is pressed out of the column.

In order to exchange resin which can no longer be regenerated, after removing the feed line 5 and the discharge line 6, the head 4 is drawn out of the recess 19 in the upper terminating wall of the casing 1 and of the respective column 2 and 3, respectively by being rotated about the central axis, following which a suction pipe can be introduced, with which the used resin can be drawn out of the column. After filling with new resin, and possible activation of the same, the column is once more ready for operation following the insertion of the head 4.

In summary, the innovation further offers the possibility of a throughput of up to 30 1/min, since an operating pressure of about 6 bar is possible. In spite of this high throughput, a conductivity of the water of 0.5 $\mu$S and below can be achieved. In addition, the device can be transported without problems, since on the basis of the leakproof casing it virtually forms a double-walled vessel, since the casing 1 acts as an intercepting space for any possible leaky column, so that any liquid which has emerged from the column and which can still be contaminated with metals from the electric erosion can be restrained from running out in an uncontrolled manner.

What is claimed is:

1. A device for the desalination and conditioning of water, comprising:
   two ion exchange columns fluidly connected to each other, one filled with cationic exchange resin and the other filled with anionic exchange resin, the two ion exchange columns being arranged in a common casing, each of the two ion exchange columns having
   a removable head for sealably attaching to an upper end of an associated one of the two ion exchange columns,
   a feed line connected to the removable head,
   a discharge line connected to the removable head, and
   a fall pipe extending toward a lower end of the associated column and being connected to the feed line on a side of the removable head that faces an interior of the associated column; and
   a removable connecting line for connecting the discharge line of a first of the two ion exchange columns, such that, when the removable connecting line is removed, the two ion exchange columns are connectable to a regeneration station for leading regeneration liquid into the two ion exchange columns via the respective discharge line and for leading regeneration liquid out of the two ion exchange columns via the respective feed line.

2. The device as claimed in claim 1, further comprising a distributor head located at a lower end of the fall pipe, the distributor head having radially outwardly opening outlet channels.

3. The device as claimed in claim 2, wherein the channels are arranged at different height levels on the distributor head, the diameter of the distributor head decreasing from an uppermost level to a lowermost level.

4. The device as claimed in claim 3, further comprising, in the removable head, an annular channel which surrounds the feed line concentrically and from which the discharge line originates, the annular channel opening toward the interior of the associated column.

5. The device as claimed in claim 4, further comprising a collecting head, located adjacent the annular channel and surrounding the fall pipe concentrically, the collecting head having radially directed inlet channels.

6. The device as claimed in claim 5, wherein the inlet channels are arranged at different height levels on the collecting head, the diameter of the collecting head decreasing from an uppermost level to a lowermost level.

7. The device as claimed in claim 5, wherein the two ion exchange columns are connectable to the regeneration station such that the regeneration liquid travels through the respective discharge line, the respective collecting head, the respective column interior, the respective distributor head, the respective annular channel, and the respective feed line.

8. The device as claimed in claim 1, further comprising sealing rings for sealing off the removable head from an inner surface of the associated column, the sealing rings arranged on an outer surface of the removable head, the removable head having radially protruding attachments which, by rotating the removable head about its central axis, can be moved under corresponding retaining protrusions arranged at the upper end of the associated column.

\* \* \* \* \*